(12) United States Patent
Zhu et al.

(10) Patent No.: US 10,679,025 B2
(45) Date of Patent: Jun. 9, 2020

(54) SURFACE TEXTURE IDENTIFICATION DISPLAY DEVICE AND SURFACE TEXTURE IDENTIFICATION METHOD

(71) Applicants: BOE TECHNOLOGY GROUP CO., LTD., Beijing (CN); ORDOS YUANSHENG OPTOELECTRONICS CO., LTD., Ordos, Inner Magnolia (CN)

(72) Inventors: Jianchao Zhu, Beijing (CN); Hao Zhang, Beijing (CN)

(73) Assignees: BOE TECHNOLOGY GROUP CO., LTD., Beijing (CN); ORDOS YUANSHENG OPTOELECTRONICS CO., LTD, Ordos (CN)

( * ) Notice: Subject to any disclaimer, the term of this patent is extended or adjusted under 35 U.S.C. 154(b) by 87 days.

(21) Appl. No.: 16/034,860

(22) Filed: Jul. 13, 2018

(65) Prior Publication Data

US 2019/0114460 A1  Apr. 18, 2019

(30) Foreign Application Priority Data

Oct. 12, 2017 (CN) .......................... 2017 1 0948360

(51) Int. Cl.
*G06K 9/00* (2006.01)
*G06F 3/041* (2006.01)
*G06T 7/42* (2017.01)

(52) U.S. Cl.
CPC ....... *G06K 9/00013* (2013.01); *G06F 3/0412* (2013.01); *G06T 7/42* (2017.01)

(58) Field of Classification Search
CPC ...... G06K 9/00013; G06T 7/42; G06F 3/0412
See application file for complete search history.

(56) References Cited

U.S. PATENT DOCUMENTS

| 10,055,637 B2* | 8/2018 | MacDonald ....... G06K 9/00013 |
| 10,216,975 B1* | 2/2019 | He ....................... G06K 9/2018 |

(Continued)

FOREIGN PATENT DOCUMENTS

| CN | 106298859 A | 1/2017 |
| CN | 106934379 A | 7/2017 |
| CN | 107168464 A | 9/2017 |

OTHER PUBLICATIONS

The First Chinese Office Action dated Jun. 21, 2019; Appln. No. 201710948360.8 .

*Primary Examiner* — Utpal D Shah

(57) ABSTRACT

A surface texture identification display device and a surface texture identification method are provided. The surface texture identification method has a first surface for being contacted with a textured surface. The surface texture identification display device includes: an opaque backplane; a plurality of electroluminescent pixel units, located between the opaque backplane and the first surface and arranged in a plurality of rows extending in a first direction and a plurality of columns extending in a second direction; an image sensor located on a side of the opaque backplane away from the first surface; and a plurality of imaging pinholes, passing through the opaque backplane and configured to image the textured surface onto the image sensor. In a plan view of the surface texture identification display device, the plurality of pixel units and the plurality of imaging pinholes are located within an effective display region.

9 Claims, 2 Drawing Sheets

(56) References Cited

U.S. PATENT DOCUMENTS

| | | | |
|---|---|---|---|
| 2015/0186710 A1 | 7/2015 | Ahn et al. | |
| 2017/0220838 A1* | 8/2017 | He | G06K 9/0004 |
| 2017/0270342 A1* | 9/2017 | He | G06F 3/0412 |
| 2017/0316248 A1* | 11/2017 | He | G06K 9/00006 |
| 2018/0012069 A1* | 1/2018 | Chung | A61B 5/1172 |
| 2018/0260602 A1* | 9/2018 | He | G06K 9/0008 |
| 2019/0156097 A1 | 5/2019 | Liu et al. | |

\* cited by examiner

SURFACE TEXTURE IDENTIFICATION DISPLAY DEVICE AND SURFACE TEXTURE IDENTIFICATION METHOD

The present application claims priority of Chinese Patent Application No. 201710948360.8 filed on Oct. 12, 2017, the disclosure of which is incorporated herein by reference in its entirety as part of the present application.

TECHNICAL FIELD

Embodiments of the present disclosure relate to a surface texture identification display device and a surface texture identification method.

BACKGROUND

With continuous development of electronic science and technology, fingerprint identification is widely used in electronic devices such as a mobile phone, a computer and a personal digital assistant.

The electronic device emphasizes a screen-to-body ratio; however, at present, most of fingerprint identification positions of the electronic device are set below a display region of the electronic device, occupying a front area of the electronic device, failing to implement a full screen, and affecting the screen-to-body ratio. For example, most of fingerprint identification positions of a mobile phone are located in a separate Home key position below a screen of the mobile phone.

SUMMARY

An embodiment of the present disclosure provides a surface texture identification display device, having a first surface for being contacted with a textured surface, wherein the surface texture identification display device includes: an opaque backplane; a plurality of electroluminescent pixel units, located between the opaque backplane and the first surface and arranged in a plurality of rows extending in a first direction and a plurality of columns extending in a second direction; an image sensor located on a side of the opaque backplane away from the first surface; and a plurality of imaging pinholes, passing through the opaque backplane and configured to image the textured surface onto the image sensor, wherein, in a plan view of the surface texture identification display device, the plurality of pixel units and the plurality of imaging pinholes are located within an effective display region.

In an example, in the plan view of the surface texture identification display device, the effective display region includes a light emitting region and a non-light emitting region, and the plurality of imaging pinholes are located in the non-light emitting region.

In an example, in the plan view of the surface texture identification display device, in at least one of the first direction or the second direction, two or more of the electroluminescent pixel units are located between every adjacent two of the imaging pinholes.

In an example, the surface texture identification display device is a touch display device, the surface texture identification display device further comprises a controller, configured to enable only a part of the electroluminescent pixel units to emit light in response to a signal generated by the textured surface contacts with a partial region of the first surface, and each of the part of electroluminescent pixel units overlaps with the partial region of the first surface in a direction perpendicular to the opaque backplane.

In an example, four of the imaging pinholes which are adjacent to one another are respectively located at four vertices of a rectangle.

In an example, in at least one of the first direction or the second direction, a distance between adjacent two of the imaging pinholes is determined according to a distance between the opaque backplane and the image sensor in a direction perpendicular to the opaque backplane.

In an example, the imaging pinhole is shaped in a circular or a square.

In an example, in the plan view of the surface texture identification display device, the plurality of imaging pinholes are evenly distributed in a partial region or an entire region of the effective display region.

In an example, the surface texture identification display device is an active-matrix organic light emitting diode display panel.

Another embodiment of the present disclosure provides a surface texture identification method of the surface texture identification display device according to claim 1, including: receiving, by an image sensor, an image signal generated by light reflected by the textured surface and passing through the imaging pinhole, when it is detected that the textured surface contacts with the first surface of the surface texture identification display device; and completing texture identification of the textured surface according to the image signal.

In an example, the surface texture identification display device is a touch display device, the surface texture identification method further includes: enabling only a part of the electroluminescent pixel units to emit light in response to the image signal generated by the textured surface contacts with a partial region of the first surface, wherein each of the part of electroluminescent pixel units overlapping with the partial region of the first surface in a direction perpendicular to the opaque backplane.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the present disclosure.

DETAILED DESCRIPTION

Figure 1:
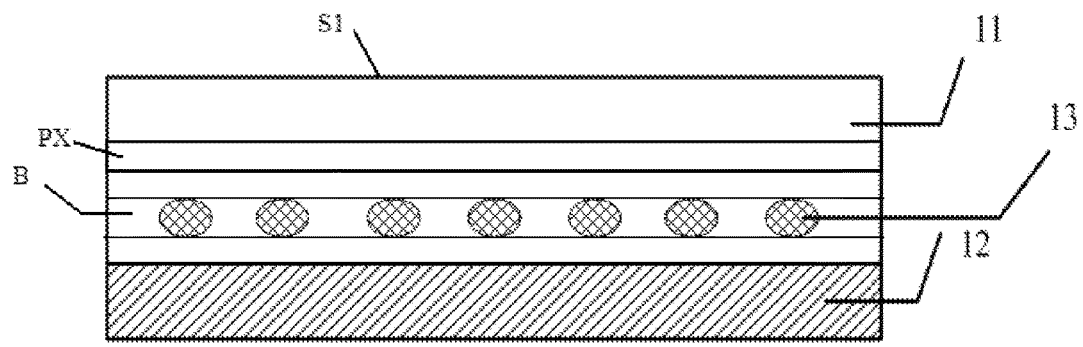
FIG. 1 shows a cross-sectional structural schematic structure of a surface texture identification display device provided by an embodiment of the present disclosure.

In order to make objects, technical details and advantages of the embodiments of the present disclosure apparent, the technical solutions of the embodiment will be described in a clearly and fully understandable way in connection with the drawings related to the embodiments of the present disclosure. It is obvious that the described embodiments are just a part but not all of the embodiments of the present disclosure. Based on the described embodiments herein, those skilled in the art can obtain other embodiment(s), without any inventive work, which should be within the scope of the present disclosure. It should be noted that, embodiments and technical features in the embodiments of the present disclosure may be combined with each other, in case of no conflict.

Embodiments of the present disclosure provide a surface texture identification display device capable of being embedded in the display region of the electronic device. Hereinafter, the present disclosure will be described in detail with reference to the drawings and in combination with the embodiments.

Thicknesses, region sizes, and shapes of respective parts in the drawings do not reflect true proportions of the respective parts, and are only intended to schematically illustrate contents of the present disclosure.

As shown in FIG. 1, an embodiment of the present disclosure provides a surface texture identification display device having a first surface S1 for being contacted with a textured surface.

The surface texture identification display device comprises an organic electroluminescent display panel 11 with a touch function and an optical image sensor 12.

The optical image sensor 12 is located below the organic electroluminescent display panel 11.

An opaque backplane B of the organic electroluminescent display panel 11 is provided therein with imaging pinholes 13, and the imaging pinholes 13 are arranged in an array. The imaging pinhole 13 is configured for imaging a fingerprint located above the imaging pinhole 13 and in contact with the organic electroluminescent display panel 11 onto the optical image sensor 12. Here, the fingerprint is an example of the textured surface. The opaque backplane B is for example substantially paralleled with the first surface S1.

A plurality of imaging pinholes 13 pass through the opaque backplane B and are configured to image the textured surface onto the optical image sensor 12.

Figure 2:
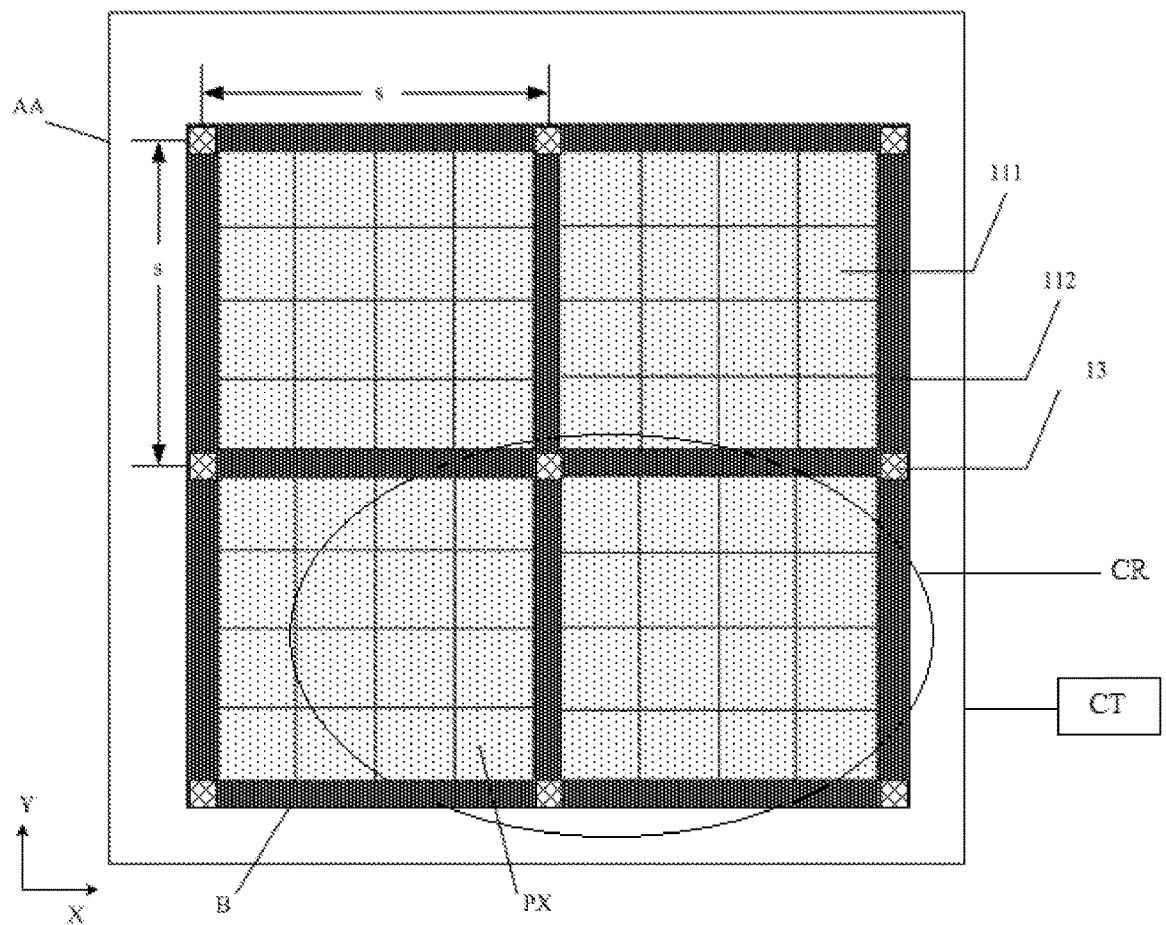
FIG. 2 shows a top-view structural schematic structure of a surface texture identification display device provided by the embodiment of the present disclosure.

A plurality of electroluminescent pixel units PXs are located between the opaque backplane B and the first surface S1, and arranged in a plurality of rows extending in a first direction X and a plurality of columns extending in a second direction Y, with reference to FIG. 1 and FIG. 2. In FIG. 1, the plurality of electroluminescent pixel units PXs are schematically shown as one layer.

In a plan view of the surface texture identification display device, with reference to FIG. 2, the plurality of pixel units PXs and the plurality of imaging pinholes 13 are located within an effective display region AA.

In the embodiment of the present disclosure, the plurality of imaging pinholes 13 is provided on the organic electroluminescent display panel 11. Therefore, fingerprint identification on a display region of an electronic device is implemented in a pinhole imaging principle, and the method does not need to additionally occupy a frontal area of the electronic device, so that full-screen display of the electronic device can be achieved, which greatly improves a screen-to-body ratio of the electronic device.

In addition, in order to cooperate with a pinhole imaging resolution, Dots Per Inch (DPI) of the optical image sensor 12 is higher than Pixels Per Inch (PPI) of the organic electroluminescent display panel 11 according to the embodiment of the present disclosure. According to a current technological level of a display panel production line, the standard can be achieved.

For example, the effective display region AA of the organic electroluminescent display panel 11 according to the embodiment of the present disclosure includes a plurality of light emitting regions 111, and an interval region between any two adjacent light emitting regions 111 is a non-light emitting region 112. The imaging pinholes 13 are all located in the non-light emitting region 112. Herein, The plurality of the light emitting regions 111 and the plurality of the electroluminescent pixel units PXs are in one-to-one correspondence. The plurality of light emitting regions 111 is enclosed and defined by the non-light emitting region 112 in the effective display region AA.

For example, the imaging pinholes 13 according to the embodiment of the present disclosure may be, but are not limited to, arranged in a rectangular array. For example, as shown in FIG. 2, the imaging pinholes 13 are located in the non-light emitting region 112, and are arranged in a rectangular array. Four of the imaging pinholes 13 which are adjacent to one another are respectively located at four vertices of a rectangle.

Further, in any row and/or any column of the rectangular array, a distance (also referred to as a hole pitch) s between two adjacent imaging pinholes 13 may be determined according to a vertical distance between a layer where the imaging pinholes 13 are located and the optical image sensor 12. Here, the vertical distance refers to a distance in a direction perpendicular to the backplane B. For example, the distance s between two adjacent imaging pinholes 13 satisfy a requirement for automatically splicing sub-images as required by the optical image sensor 12; if the hole pitch s is too large, the optical image sensor 12 will have a portion where no light arrives; and if the hole pitch s is too small, repeated reception will be caused, which will result in interference and affect a signal-to-noise ratio.

For example, as shown in FIG. 2, a shape of the imaging pinhole 13 according to the embodiment of the present disclosure may be a square or a circle, and a square or circular imaging pinhole 13 is more convenient and simple in design. Of course, for example, the shape of the imaging pinhole 13 may also be set to other shapes, for example, a diamond shape, and a specific shape of the imaging pinhole 13 will not be limited in the embodiment of the present disclosure.

For example, when the shape of the imaging pinhole 13 according to the embodiment of the present disclosure is a square, the imaging pinhole 13 may be a square of 5 micron (um)*5 um, a size of which is determined by illumination requirement of the optical image sensor 12. After the hole pitch s is determined, when designing the pixel units in the light emitting region 111, a certain space can be saved for each pixel unit, so that the saved space may be used for placing the imaging pinhole 13. In this way, regular arrangement of the imaging pinholes 13 may be implemented without changing a layout of the pixel units or increasing design difficulty.

Further, the imaging pinholes 13 may be evenly distributed in a designated partial region in the effective display region AA of the organic electroluminescent display panel 11, for example, a lower half of the effective display region AA. The imaging pinholes 13 may also be evenly distributed in an entire region of the effective display region AA of the organic electroluminescent display panel 11.

When the imaging pinholes 13 are distributed in a designated partial region of the effective display region AA of the organic electroluminescent display panel 11, costs can be saved, and fingerprint collection at the designated region of the display panel of is implemented; and when the imaging pinholes 13 are distributed in the entire region of the effective display region AA of the organic electroluminescent display panel 11, full-screen fingerprint identification can be implemented, which is more convenient in operation and better in user experience.

For example, the fingerprint identification display device further comprises a controller CT, configured to enable only a part of the electroluminescent pixel units PXs to emit light in response to the signal generated by the textured surface contacts with the partial region CR of the first surface S1. Referring to FIG. 2, the partial region CR of the first surface S1 is shown as an elliptical region. Each of the part of electroluminescent pixel units PXs overlaps with the partial region CR of the first surface S1 in a direction perpendicular to the opaque backplane B.

Further, the organic electroluminescent display panel 11 according to the embodiment of the present disclosure can be an Active-matrix Organic Light Emitting Diode (AMO-LED) display panel.

Based on a same inventive concept, an embodiment of the present disclosure further provides a touch display device, the touch display device comprises the above-described surface texture identification display device provided by the embodiment of the present disclosure, and the touch display device may be: a mobile phone, a tablet personal computer, a liquid crystal television, a laptop, a digital photo frame, a navigator, and any other product or component having a touch display function. With respect to other essential components of the touch display device, they should all be presented as by understood those ordinarily skill in the art, which will not be repeated here.

Figure 3:
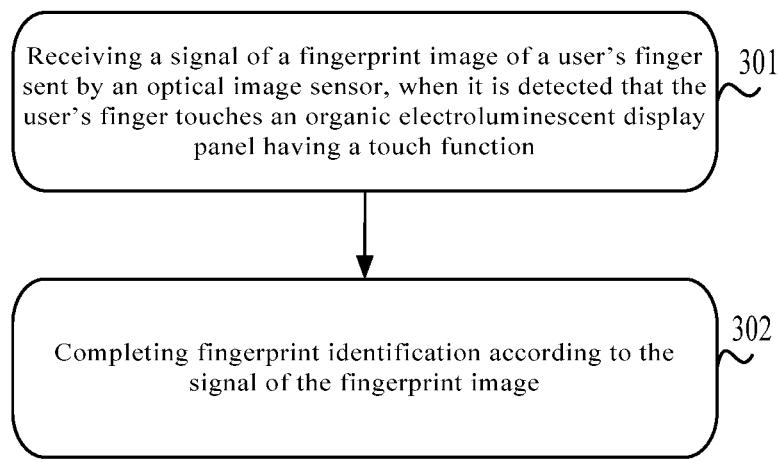
FIG. 3 shows a flow chart of a surface texture identification method provided by an embodiment of the present disclosure.

Based on a same inventive concept, an embodiment of the present disclosure further provides a fingerprint identification method of the above-described surface texture identification display device, and as shown in FIG. 3, the method comprises:

Step 301: receiving a signal of a fingerprint image of a user's finger sent by an optical image sensor, when the user's finger is detected to touch the organic electroluminescent display panel having a touch function; wherein, the fingerprint image is imaged by imaging pinholes of the organic electroluminescent display panel which are located below the user's finger onto the optical image sensor.

That is, when the textured surface is detected to be in contact with the first surface of the surface texture identification display device, the optical image sensor receives light reflected by the textured surface and passing through the imaging pinhole to generate an signal of a fingerprint image;

Step 302: completing fingerprint identification according to the signal of fingerprint image.

Hereinafter, the fingerprint identification method according to the embodiment of the present disclosure will be specifically described.

When the user's finger touches the organic electroluminescent display panel 11 having the touch function according to the embodiment of the present disclosure, the organic electroluminescent display panel 11 having the touch function detects the touch action and the touch position, and further activate a pixel circuit corresponding to the touch position through a corresponding processor, so that the corresponding pixel units directly below the finger emits illumination light. Time for it to emit illumination light may be set for a purpose that a target pattern can be shot clearly, and should not be too long, to avoid affecting a display effect. Illumination light emitted by the pixel unit irradiates upwards onto the user's finger, and light irradiating on the user's finger is reflected by the finger and then again enters the organic electroluminescent display panel 11 having the touch function, the light passes through the imaging pinhole 13 and irradiates onto the optical image sensor 12, and the optical image sensor 12 then analyzes and calculates according to received light, to obtain the fingerprint image of the user's finger, and further complete fingerprint identification.

For example, a mobile phone is taken as an example of the surface texture identification display device according to the embodiment of the present disclosure. When fingerprint identification is performed, the user's finger touches a display screen of the mobile phone, a processor inside the mobile phone controls only the portion of the organic electroluminescent display panel corresponding to a finger touch region to emit light; emitted light irradiates onto the user's finger; as reflected by the finger, light enters the organic electroluminescent display panel again, the light passes through the imaging pinhole, irradiating onto the optical image sensor, and the optical image sensor further analyzes and calculates according to received light, to obtain a fingerprint image of the user's finger. Afterwards, the processor inside the mobile phone further performs data matching on the obtained fingerprint image of the user's finger with a pre-stored fingerprint; if the matching is unsuccessful, the user is prompted to retry; and if the matching is successful, unlocking the mobile phone is completed or a corresponding software operation is executed.

In summary, the embodiment of the present disclosure provides the surface texture identification display device, which has a plurality of imaging pinholes provided in the effective display region AA of the organic electroluminescent display panel, so as to perform fingerprint identification on the display region of the electronic device in the pinhole imaging principle; the method does not need to occupy the frontal area of the electronic device, so that full-screen display of the electronic device may be implemented, which greatly improves the screen-to-body ratio of the electronic device.

The above is merely description of illustrative embodiments of the present disclosure and technical principles applied thereto. Those skilled in the art should understand that the scope of disclosure involved in the present disclosure is not limited to the technical solutions specifically formed by combination of the above-described technical features, and at a same time, should also cover other technical solutions formed by an arbitrary combination of the above-described technical features or equivalent features thereof, without departing from the inventive concept; for example, technical solutions formed by replacing the above-described features and technical features having functions similar to those disclosed (but not limited) in the present disclosure mutually with each other.

The foregoing embodiments merely are exemplary embodiments of the present disclosure, and not intended to define the scope of the present disclosure, and the scope of the present disclosure is determined by the appended claims.

The invention claimed is:

1. A surface texture identification display device, having a first surface for being contacted with a textured surface, wherein the surface texture identification display device comprises:
   an opaque backplane;
   a plurality of electroluminescent pixel units, located between the opaque backplane and the first surface and arranged in a plurality of rows extending in a first direction and a plurality of columns extending in a second direction;
   an image sensor located on a side of the opaque backplane away from the first surface; and a plurality of imaging pinholes, passing through the opaque backplane and configured to image the textured surface onto the image sensor, wherein, in a plan view of the surface texture identification display device, the plurality of pixel units and the plurality of imaging pinholes are located within an effective display region, wherein in the plan view of the surface texture identification display device, the effective display region includes a light emitting region and a non-light emitting region, and the plurality of imaging pinholes are located in the non-light emitting region, in the plan view of the surface texture identification display device, in at least one of the first direction or the second direction, two or more of the electroluminescent pixel units are located between every adjacent two of the imaging pinholes.

2. The surface texture identification display device according to claim 1, wherein, the surface texture identification display device is a touch display device, the surface texture identification display device further comprises a controller, configured to enable only a part of the electroluminescent pixel units to emit light in response to a signal generated by the textured surface contacts with a partial region of the first surface, and each of the part of electroluminescent pixel units overlaps with the partial region of the first surface in a direction perpendicular to the opaque backplane.

3. The surface texture identification display device according to claim 1, wherein, four of the imaging pinholes which are adjacent to one another are respectively located at four vertices of a rectangle.

4. The surface texture identification display device according to claim 1, wherein, in at least one of the first direction or the second direction, a distance between adjacent two of the imaging pinholes is determined according to a distance between the opaque backplane and the image sensor in a direction perpendicular to the opaque backplane.

5. The surface texture identification display device according to claim 1, wherein, the imaging pinhole is shaped in a circular or a square.

6. The surface texture identification display device according to claim 1, wherein, in the plan view of the surface texture identification display device, the plurality of imaging pinholes are evenly distributed in a partial region or an entire region of the effective display region.

7. The surface texture identification display device according to claim 1, wherein, the surface texture identification display device is an active-matrix organic light emitting diode display panel.

8. A surface texture identification method of the surface texture identification display device according to claim 1, comprising:

receiving, by an image sensor, an image signal generated by light reflected by the textured surface and passing through the imaging pinhole, when it is detected that the textured surface contacts with the first surface of the surface texture identification display device; and completing texture identification of the textured surface according to the image signal.

9. The surface texture identification method according to claim 8, wherein, the surface texture identification display device is a touch display device, the surface texture identification method further comprises: enabling only a part of the electroluminescent pixel units to emit light in response to the image signal generated by the textured surface contacts with a partial region of the first surface, wherein each of the part of electroluminescent pixel units overlapping with the partial region of the first surface in a direction perpendicular to the opaque backplane.

* * * * *

UNITED STATES PATENT AND TRADEMARK OFFICE
CERTIFICATE OF CORRECTION

PATENT NO. : 10,679,025 B2  
APPLICATION NO. : 16/034860  
DATED : June 9, 2020  
INVENTOR(S) : Jianchao Zhu and Hao Zhang Page 1 of 1

It is certified that error appears in the above-identified patent and that said Letters Patent is hereby corrected as shown below:

On the Title Page

Item (73) the Second Assignee name:
ORDOS YUANSHENG OPTOELECTRONICS CO., LTD, Ordos (CN)

Is changed to:
ORDOS YUANSHENG OPTOELECTRONICS CO., LTD., Ordos, Inner Mongolia (CN)

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*